United States Patent [19]
Heier et al.

[11] Patent Number: 5,180,621
[45] Date of Patent: Jan. 19, 1993

[54] HEAT-SHRINKABLE ENVELOPE HAVING A TEAR-RESISTANT REINFORCING COMPONENT

[75] Inventors: Manfred Heier, Herdecke; Uwe Brudermann, Heikendorf; Christian Kipfelsberger, Hepberg, all of Fed. Rep. of Germany

[73] Assignee: RXS Schrumpftechnik-Garnituren GmbH, Fed. Rep. of Germany

[21] Appl. No.: 888,467

[22] Filed: May 21, 1992

Related U.S. Application Data

[63] Continuation of Ser. No. 586,872, Sep. 24, 1990, abandoned.

[30] Foreign Application Priority Data

Oct. 20, 1989 [DE] Fed. Rep. of Germany ....... 3935045

[51] Int. Cl.⁵ .................... B32M 3/24; B29C 61/00
[52] U.S. Cl. .................. 428/138; 428/34.9; 428/134; 428/137; 428/156; 428/161; 428/195; 428/213; 428/516; 428/515; 428/521; 428/913; 428/136; 428/198; 428/162; 428/174; 428/181; 428/182; 428/167; 174/DIG. 8; 156/86

[58] Field of Search ............... 428/34.9, 138, 134, 428/137, 156, 161, 195, 213, 516, 515, 521, 913, 136, 198, 162, 174, 181, 182, 167; 174/DIG. 8; 156/86; 264/230

[56] References Cited

U.S. PATENT DOCUMENTS

| | | | |
|---|---|---|---|
| 3,946,143 | 3/1976 | McLoughlin | 174/DIG. 8 X |
| 4,016,356 | 4/1977 | McLoughlin | 428/34.9 |
| 4,816,326 | 3/1989 | Jones et al. | 428/34.9 X |
| 4,857,370 | 8/1989 | Overbergh et al. | 428/34.9 |
| 4,929,477 | 5/1990 | Will | 174/DIG. 8 X |
| 4,952,438 | 8/1990 | Kipfelsberger et al. | 428/68 |
| 5,029,241 | 7/1991 | Robinson | 174/DIG. 8 X |

FOREIGN PATENT DOCUMENTS

| | | | |
|---|---|---|---|
| 0265200 | 4/1988 | European Pat. Off. | 428/34.9 |
| 0117026 | 6/1989 | European Pat. Off. | |

Primary Examiner—Donald J. Loney
Assistant Examiner—William P. Watkins, III

[57] ABSTRACT

The invention is directed to a heat-shrinkable envelope composed of a heat-shrinkable component and a reinforcing component that is embedded in the heat-shrinkable component and has undulations or corrugations. The reinforcing component has special arrangements for stopping tears, such as the provisions of embossments or beads, the provision of holes, punctures and slots.

15 Claims, 2 Drawing Sheets

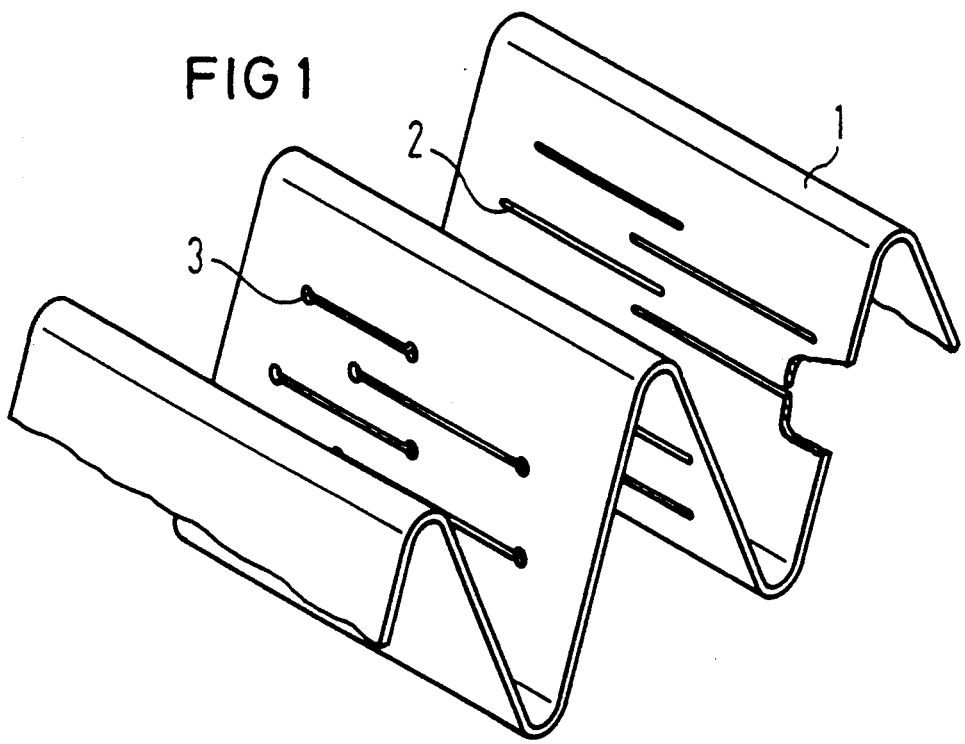
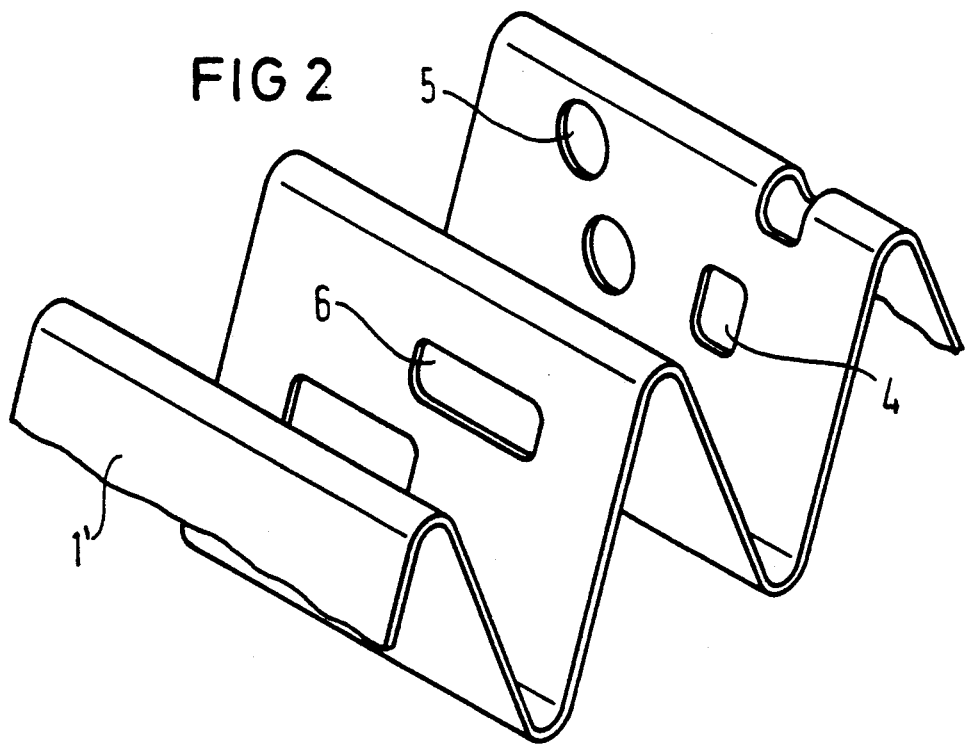

HEAT-SHRINKABLE ENVELOPE HAVING A TEAR-RESISTANT REINFORCING COMPONENT

This is a continuation of application Ser. No. 07/586,872, filed Sep. 24, 1990 abandoned.

BACKGROUND OF THE INVENTION

The present invention is directed to a heat-shrinkable envelope composed of at least one heat-shrinkable component containing a mechanical reinforcing component.

Heat-shrinkable envelopes are known that contain a reinforcing inlay, such as a woven fabric or knit, to improve the mechanical properties. Such a heat-shrinkable envelope is disclosed, for example, in European Patent Application EP 0 117 026. Both shrinkable as well as non-shrinkable woven fabrics or knits are employed therein, and these are embedded in a polymeric matrix. Such arrangements are relatively difficult to manufacture and involve great cost.

SUMMARY OF THE INVENTION

An object of the present invention is to create a heat-shrinkable envelope whose mechanical stressability is to be improved, particularly to prevent both tearing and continued tearing.

The objects are achieved with a heat-shrinkable envelope having at least one heat-shrinkable component with a mechanical reinforcing component, the improvements comprising an intrinsic reinforcing component being brought into union with the shrinkable component so that the dilation and shrinkage motions are possible without disturbance and in that the intrinsic reinforcing component has means that stop or prevent tears.

The intrinsic reinforcing component of an undulating or corrugated embedded component, that are already intrinsically reinforced, can be additionally improved when, in addition to the undulations, it has means that will additionally reinforce and stop tears which are introduced to these components. Such means can be produced, for example, by formations of punctures, incisions, slots, holes, or the like. The effect is that since the material has already been intentionally interrupted at this location in an appropriate way, the tear, which may potentially occur, is stopped when it encounters such a means. The same effect is achieved when beads or deformed portions or the like are introduced into the embedded component. A tear-stopping effect can also be achieved when a plurality of layers of different materials are provided. Furthermore, any and all combinations of the above-mentioned possibilities are conceivable.

All shrink compounds that have been heretofore standard come into consideration as materials. These cover, in a very broad term, any type of cross-linkable, crystalline thermal plastic. High-molecular polyethylene, polypropylene, polybutene, polyethylene, terephthylate, etc., are particularly suitable for this purpose.

Other advantages and features of the invention will be readily apparent from the following description of the preferred embodiments, the drawings and claims.

BRIEF DESCRIPTION OF THE DRAWINGS

FIG. 1 is a perspective view of a first embodiment of an embedded component in accordance with the present invention;

FIG. 2 is a perspective view of a second embodiment of the component of the present invention;

DESCRIPTION OF THE PREFERRED EMBODIMENTS

Figure 3:
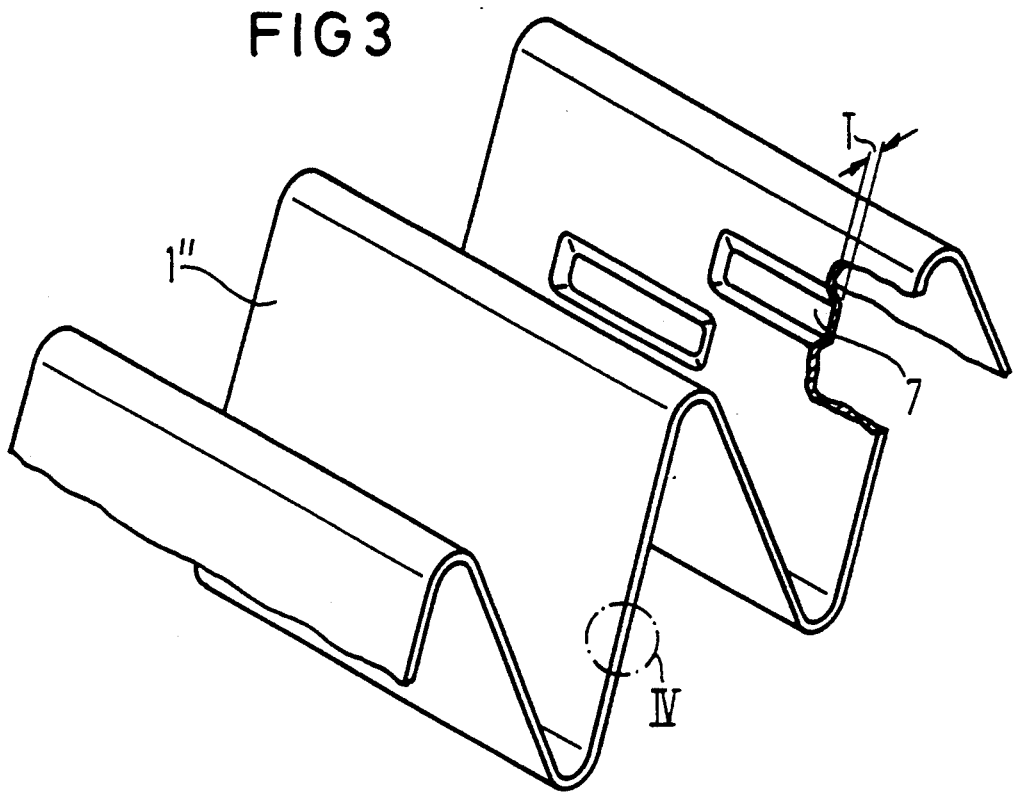
FIG. 3 is a perspective view of a third embodiment of the embedded component.

The principles of the present invention are particularly useful when incorporated in a mechanically reinforcing component 1, which is illustrated in FIG. 1, and is to be embedded into a shrinkable component SK (FIG. 5) for the purpose of enhancing the mechanical properties of the envelope SU formed by the shrinkable component. This embedded component 1 is fashioned in an undulating or corrugated form, wherein the direction of the undulations of the component embed into the shrinkable component proceed parallel to or, respectively, at an arbitrary angle relative to the dilation or, respectively, shrink direction of the overall envelope. Thus, the crests of the undulations will extend transverse or at an angle to the shrinking direction. The intrinsic reinforcing or self-reinforced component 1 can, therefore, follow the motion direction in the dilation, stretching and/or shrink process without destruction when the undulations are appropriately matched to the degree of shrinkage.

In order to increase the intrinsic strength vis-a-vis the mechanical stresses, in particularly to prevent the formation of tears, intentional punctures or slots 2 are then, additionally, arranged in the component 1. These punctures or slots 2, for example, are provided with rounded-off incisions 3 at their ends and the slots 2 are arranged in an offset manner, which is a suitable way as an arrangement to stop tears. As a result of their intentionally introduced arrangement, for example, a tear can spread up to one of the slots. However, it will be stopped, since the opposite side of the slot cannot be influenced by the tear that has migrated into the area of the slot.

FIG. 2 shows another construction for the means to stop tears in the component 1', which are illustrated as comprising a plurality of holes 4, 5 and 6, which have various shapes. By contrast to the line-shaped slots 3 of the embodiment of FIG. 1, tears coming from different incoming directions will be stopped by the arrangement of the holes 4, 5 and 6 of the embodiment of FIG. 2.

Another embodiment for means for preventing tears is illustrated in FIG. 3 and is formed by beads or embossments 7 which have an appropriate depth T and are introduced into the component 1". The thickening portion of the material is also suitable for this in a similar fashion.

Figure 4:
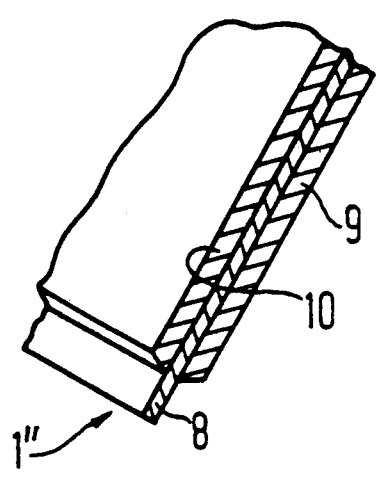
FIG. 4 is a partial cross sectional view taken in the area of IV—IV of FIG. 3.

In FIG. 4, the means for preventing tears is also encountered and is formed by a plurality of layers 8, 9 and 10 as a composite foil. These layers are preferably composed of different materials.

Of course, the various arrangements can also be combined with one another in an appropriate way. The round undulations are also not compulsory. Other geometrical shapes of the intrinsic reinforced or self-reinforced component 1 can also be used so that the dilation or shrinkage can, likewise, occur non-destructively.

Figure 5:
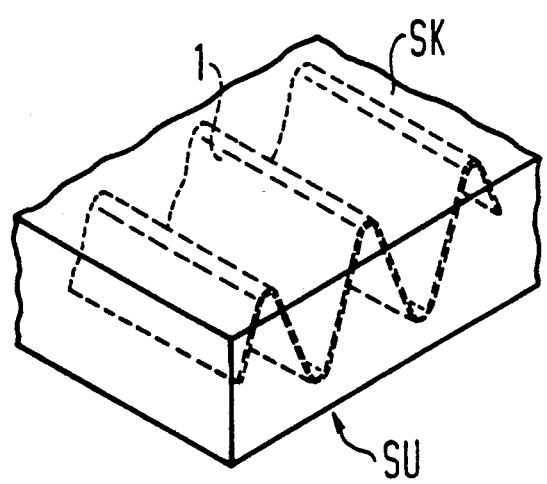
FIG. 5 is a perspective view showing the embedding of the intrinsic reinforcing component in a shrinkable component.

Thus, the reinforcing components 1, 1', and 1" are composed of a plurality of planar surface portions joined in a continuous undulating configuration which, as illustrated in FIGS. 1-3, is non-woven and does not include a woven component. This component 1, 1' or 1" is embedded in the shrinkable component and, as illustrated in FIG. 5, this means that the material engages opposite surfaces of the component so that "embedded" does not mean "surrounded by" in the sense of heat shrink components and reinforcing components being on different radii or planes. The slots 3, holes 4, 5 and 6 and the embossments, beads or deformed portions are irregularly located so that the openings and other elements in the reinforcing components are not in a regular pattern of variations, such as formed by the weave of a woven component.

As shown, for example in FIG. 5, the reinforcing component 1 is embedded into a shrinkable component SK composed, preferably, of a cross-linked and expanded polyolefin to form the heat-shrinkable envelope SU. For example, a polyolefin selected from a group consisting of high-molecular polyethylene and polybutane.

It is also possible that, dependent on the geometric form, the component can be joined to the shrinkable component SK surface-wide, line-shaped or only in sub-regions. For this purpose, hot-melt glues can be used to cause this joining. The wall thickness of the individual layers can differ in relation to the need. The cross-linking of the later shrinkable material, which cross-linking is required for the shrinkability, can be executed either by a chemical cross-linking method or by radiation cross-linking. Non-shrinkable, as well as shrinkable, plastic materials can be used for the reinforcing component 1.

We claim:

1. In a heat-shrinkable envelope composed of at least one heat-shrinkable component having a mechanically reinforcing component, the improvements comprising the mechanical reinforcing component having a plurality of planar surfaces joined in a continuous undulating configuration and being embedded in the shrinkable component, said reinforcing component being constructed to enable both dilation and shrink motions non-destructively along both dilation and shrink directions, said undulations extending parallel to each other, and the reinforcing component having means for stopping tears in the reinforcing component formed by irregularly located beads, punctures, slots, or holes in the reinforcing component.

2. In a heat-shrinkable envelope according to claim 1, wherein the means for stopping tears includes beads formed in the reinforcing component.

3. In a heat-shrinkable envelope according to claim 1, wherein the means for stopping tears includes intentionally punctures, slots and holes formed in the reinforcing component.

4. In a heat-shrinkable envelope according to claim 1, wherein the reinforcing component is constructed as a composite foil.

5. In a heat-shrinkable component according to claim 4, wherein the outermost layers of the composite foil are provided with punctures, slots and holes.

6. In a heat-shrinkable component according to claim 1, wherein the reinforcing component has individual layers joined with an adhesive promoter.

7. In a heat-shrinkable envelope according to claim 6, in that the individual layers of the reinforced component are joined with a hot-melt glue.

8. In a heat-shrinkable envelope according to claim 1, wherein both the reinforcing component and the shrinkable component are composed of a cross-linked, expanded polyolefin.

9. In a heat-shrinkable envelope according to claim 8, wherein the expanded polyolefin is selected from a group consisting of high-molecular polyethylene and polybutene.

10. In a heat-shrinkable envelope according to claim 1, wherein the envelope has individual layers with each layer having a different thickness.

11. In a heat-shrinkable envelope according to claim 1, wherein the envelope has individual layers with each layer having a different degree of cross linking.

12. In a heat-shrinkable envelope according to claim 11, wherein the cross-linking of at least one of the components is caused by chemical cross-linking.

13. In a heat-shrinkable envelope according to claim 11, wherein cross-linking of at least one of the cross-linking components is caused by radiation.

14. In a heat-shrinkable envelope according to claim 1, wherein the reinforcing component is also heat-shrinkable.

15. In a heat-shrinkable envelope according to claim 6, wherein a bonding of the heat-shrinkable component to the reinforcing component occurs along lines with the undulations.

* * * * *